United States Patent
Lentz et al.

(10) Patent No.: US 9,972,124 B2
(45) Date of Patent: May 15, 2018

(54) ELIMINATION OF MINIMAL USE THREADS VIA QUAD MERGING

(71) Applicant: Samsung Electronics Co., Ltd., Suwon-si, Gyeonggi-do (KR)

(72) Inventors: Derek J. Lentz, Reno, NV (US); Veynu T. Narasiman, Austin, TX (US); Karthik Ramani, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/633,702

(22) Filed: Jun. 26, 2017

(65) Prior Publication Data

US 2017/0309065 A1 Oct. 26, 2017

Related U.S. Application Data

(63) Continuation-in-part of application No. 14/671,467, filed on Mar. 27, 2015, now Pat. No. 9,721,376.

(60) Provisional application No. 62/018,040, filed on Jun. 27, 2014.

(51) Int. Cl.
| | |
|---|---|
| *G06T 15/80* | (2011.01) |
| *G06T 15/40* | (2011.01) |
| *G06T 15/00* | (2011.01) |

(52) U.S. Cl.
CPC ............ *G06T 15/80* (2013.01); *G06T 15/005* (2013.01); *G06T 15/40* (2013.01)

(58) Field of Classification Search
CPC .......... G06T 15/005; G06T 15/40; G06F 9/44
See application file for complete search history.

(56) References Cited

U.S. PATENT DOCUMENTS

| | | | |
|---|---|---|---|
| 5,748,863 A | * | 5/1998 | Fossum ................ G06T 15/405 345/419 |
| 5,886,701 A | | 3/1999 | Chauvin et al. |
| 6,518,965 B2 | | 2/2003 | Dye et al. |
| 6,633,299 B1 | | 10/2003 | Sreenivas et al. |
| 6,687,396 B1 | | 2/2004 | Sugiura et al. |
| 6,697,063 B1 | | 2/2004 | Zhu |
| 6,762,765 B2 | | 7/2004 | Doyle et al. |
| 6,831,658 B2 | | 12/2004 | Taneja et al. |
| 6,943,791 B2 | | 9/2005 | Pascual et al. |

(Continued)

FOREIGN PATENT DOCUMENTS

EP 1988508 A1 11/2008

OTHER PUBLICATIONS

Fatahalian et al., "Reducing Shading on GPUs using Quad-Fragment Merging," ACM Transactions on Graphics, vol. 29, No. 4, Article 67, Jul. 2010 (8 pages).

*Primary Examiner* — Tapas Mazumder
(74) *Attorney, Agent, or Firm* — Lewis Roca Rothgerber Christie LLP

(57) ABSTRACT

Provided is a method of performing coverage merging in a shading stage of a graphics system. The method includes: performing a draw call on primitives and rasterizing the primitives into blocks of pixels; selecting the draw call for merge testing of individual blocks; performing a depth test on the individual blocks; in response to the depth test being satisfied, merging partially covered fragments of the same draw call of one of the block of pixels to form a merged block of pixels; and performing shading of the merged block of pixels on a draw call basis.

18 Claims, 6 Drawing Sheets

(56) References Cited

U.S. PATENT DOCUMENTS

| | | | |
|---|---|---|---|
| 7,064,771 B1* | 6/2006 | Jouppi | G09G 5/363 345/506 |
| 8,237,738 B1 | 8/2012 | Crow | |
| 8,508,544 B1 | 8/2013 | Molnar et al. | |
| 8,547,395 B1 | 10/2013 | Hutchins et al. | |
| 2003/0076331 A1 | 4/2003 | Deering | |
| 2005/0046628 A1* | 3/2005 | Hux | G06T 15/005 345/420 |
| 2005/0212806 A1 | 9/2005 | Koselj et al. | |
| 2007/0139440 A1 | 6/2007 | Crow et al. | |
| 2008/0150950 A1* | 6/2008 | Sorgard | G06T 15/005 345/522 |
| 2012/0281004 A1 | 11/2012 | Shebanow et al. | |
| 2014/0063012 A1 | 3/2014 | Madani et al. | |
| 2015/0170410 A1* | 6/2015 | Sathe | G06T 17/20 345/426 |

* cited by examiner

ELIMINATION OF MINIMAL USE THREADS VIA QUAD MERGING

CROSS-REFERENCE TO RELATED APPLICATION(S)

This application is a continuation-in-part of U.S. application Ser. No. 14/671,467, filed Mar. 27, 2015, which claims the benefit of U.S. Provisional Application No. 62/018,040 filed Jun. 27, 2014, the entire contents of which are incorporated herein by reference.

FIELD

One or more aspects of embodiments according to the present disclosure relate to pixel shading in a graphics processing system. More particularly, embodiments of the present disclosure are directed to performing quad fragment merging to reduce a pixel shading overhead.

BACKGROUND

One aspect of many modern graphics systems that include a graphics processing unit (GPU) is that there are many pixel shader threads that require processing. This consumes power and limits performance. Techniques have been proposed to perform shading using quad-fragment merging. However, conventional approaches have many drawbacks, including various quality problems and artifacts, as well as other problems.

SUMMARY

Aspects of embodiments according to the present disclosure relate to pixel shading in a graphics processing system. More particularly, embodiments of the present disclosure are directed to performing quad fragment merging to reduce a pixel shading overhead.

According to an embodiment of the present disclosure, there is provided a method of performing coverage merging in a shading stage of a graphics system, the method including: performing a draw call on primitives and rasterizing the primitives into blocks of pixels; selecting the draw call for merge testing of individual blocks; performing a depth test on the individual blocks; in response to the depth test being satisfied, merging partially covered fragments of the same draw call of one of the blocks of pixels to form a merged block of pixels; and performing shading of the merged block of pixels on a draw call basis.

Merging may be disabled for an individual draw call based on one or more of detecting a specular lighting condition and receiving a hint that indicates that merging should be disabled. The depth test may be one or more of an absolute depth test and a depth slope test. In some embodiments, the depth test does not utilize floating point multiplication operations. The depth test may utilize fixed point depth compare and computation. The depth test may utilize floating point add and compare operations. A graphics state of the draw call may include a shared texture access and a set of variables. The method may further include: performing a test to exclude overlapping fragments; and performing a test to exclude fragments from different faces. The method may further include: performing interpolation of variables describing primitives; and performing a threshold test of estimated Z interpolation errors.

According to an embodiment of the present disclosure, there is provided a method of performing merging in a graphics system, the method including: accumulating, for a draw call or subset thereof, data of rasterized primitives; selecting the draw call for merge testing of individual blocks; performing a depth test on the individual blocks; performing, for the rasterized primitives of the draw call, merging for at least one partially covered block satisfying the depth test; and performing shading of at least one merged block of the draw call.

Merging may be disabled for an individual draw call based on one or more of detecting a specular lighting condition and receiving a hint that indicates that merging should be disabled. The depth test may be one or more of an absolute depth test and a depth slope test. In some embodiments, the depth test does not utilize floating point multiplication operations. The depth test may utilize fixed point depth compare and computation. The depth test may utilize floating point add and compare operations. The method may further include: performing a test to exclude overlapping fragments; and performing a test to exclude fragments from different faces. The method may further include: performing interpolation of variables describing primitives; and performing a threshold test of estimated Z interpolation errors.

According to an embodiment of the present disclosure, there is provided a graphics system including: a graphics processing unit (GPU) including a merge unit to perform merging on block that have coverage within primitives, wherein the merge unit merges coverage from one block into another, and performs a depth test for blocks on a selectable draw call basis.

Merging may be disabled for an individual draw call based on one or more of detecting a specular lighting condition and receiving a hint that indicates that merging should be disabled. When the specular lighting condition is detected, the specular lighting condition may include a per primitive surface normal. The depth test may be one or more of an absolute depth test and a depth slope test. In some embodiments, the depth test does not utilize floating point multiplication operations. The depth test may utilize fixed point depth compare and computation. The depth test may utilize floating point add and compare operations. A graphics state of a draw call may include a shared texture access and a set of variables.

BRIEF DESCRIPTION OF THE DRAWINGS

These and other features and aspects of the present disclosure will be appreciated and understood with reference to the specification, claims, and appended drawings wherein:

DETAILED DESCRIPTION

Aspects of embodiments according to the present disclosure relate to pixel shading in a graphics processing system.

More particularly, embodiments of the present disclosure are directed to performing quad fragment merging to reduce a pixel shading overhead.

The detailed description set forth below in connection with the appended drawings is intended as a description of exemplary embodiments of the present disclosure provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like elements or features.

Figure 1:
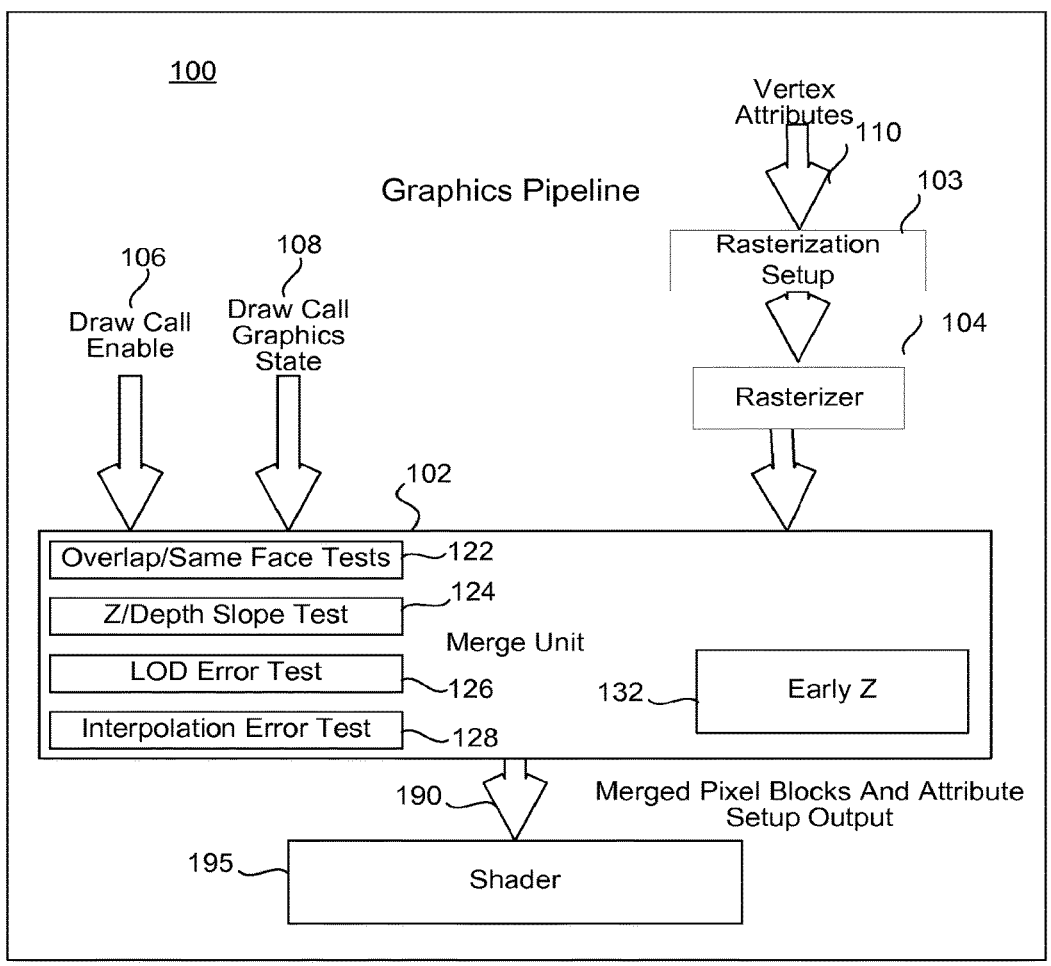
FIG. 1 is a high level block diagram of a merging unit to merge quads for shading in accordance with an embodiment of the present disclosure.

FIG. 1 is a high level block diagram of a graphics processing unit (GPU) 100 including a merge unit 102 in accordance with an embodiment of the present disclosure. In one embodiment the merge unit is a merge unit to merge partially covered fragments in pixels blocks at least as large as a quad (at least a 2×2 block of pixels). An individual block (e.g., an individual quad) may be partially covered by two or more different primitives (e.g., typically triangles). Instead of shading the same block multiple times, there is a benefit to merging partially covered blocks that satisfy one or more merge tests to reduce the number of shading threads.

A rasterization setup stage 103 receives vertex attributes. The output of the pre-rasterization setup stage goes into a rasterizer 104. The merge unit 102 receives an output of the rasterizer 104, a draw call enable signal 106, and a graphics state 108 associated with a draw call. The output 190 of the quad merge unit is provided to a shader 195 and includes information on merged blocks. An optional attribute setup output may be included. The merging unit 102 may be implemented in graphics hardware, firmware, software, or a combination thereof.

A draw call is a block of rendering primitives in a graphics system that has the same graphics state. Images are generally generated from a set of state changes and draw calls. Within a draw call, the draw call data (or a subset of a draw call such as a moving window of this data) is accumulated and merge decisions are made. In one embodiment support may be provided to accumulate data for groups of primitives or to provide a moving window of primitives and covered blocks (e.g., covered quads) for accumulating rendered and merged data.

The graphics state for a draw call will use the same textures and set of attributes, such as the varying variables (hereinafter abbreviates as "Vv", also known as as attributes) of the OpenGL® graphics language. The merge unit 102 performs merging only within draw calls. In one embodiment the merging may be enabled or disabled on a draw call basis via draw call enable 106 based on application requirements or user requirements.

Software control may be provided to enable or disable merging via the draw call enable 106. In one embodiment the merging may be enabled in a power saving mode or upon the detection of whether or not particular pixel lighting computations could beneficially utilize the merging. For example, specular lighting is a case in which merging may create image artifacts such that it may be desirable to turn merging off for specular lighting. Merging may also be selected based on the primitive or object type to be shaded. As an example, merging should be disabled for sprites and lines. Merging may further be disabled when other conditions exist such that the controlling software decides merging will result in sub quality images. Examples of conditions for disabling merging include a hint from the application program, the system user, etc. that indicates that that merging should be disabled.

According to some embodiments of the present invention, merging is generally performed whenever possible. A hint (e.g., a hint from a user through the system software) that indicates a preference for higher quality may be used to disable merging (or indicate that merging isn't desired). Further, a hint that indicates a preference for lower power consumption or higher performance would indicate merging is desired. Further, many other relevant hints can be utilized (e.g. an amount of remaining battery life, etc.) to determine when merging should be utilized.

The merge unit 102 performs one or more merge tests. To support the merge tests for depth related tests, the merge unit 102 may perform or otherwise receive inputs of an early Z compare element 132 (or an early depth compare element). In one embodiment attribute setup is performed outside of the merge process and may be delayed until after merging is completed. The merge tests may include testing whether primitives overlap and have a common face 122; a depth slope test 124; which may be indicative of a level of detail (LOD) error 126 by testing objects depth slopes (e.g., in X & Y) and disabling merging when the slope is too great or too different, preventing an LOD problem; and an interpolation error test 128 to prevent merging between primitives that are not adjacent.

While FIG. 1 shows certain tests being performed, the present disclosure is not limited thereto and, in some embodiments, other tests are performed and, in some embodiments, shown tests are not performed. For example, an absolute depth test may be performed in addition to or in place of the depth slope test 124. The absolute depth test may compare the depths of two adjacent primitives and prevent merging when difference in the depths of the two adjacent primitives is too great (e.g., above a threshold). Depth may be interpolated at a common location which may be outside one or both primitives.

Figure 2:
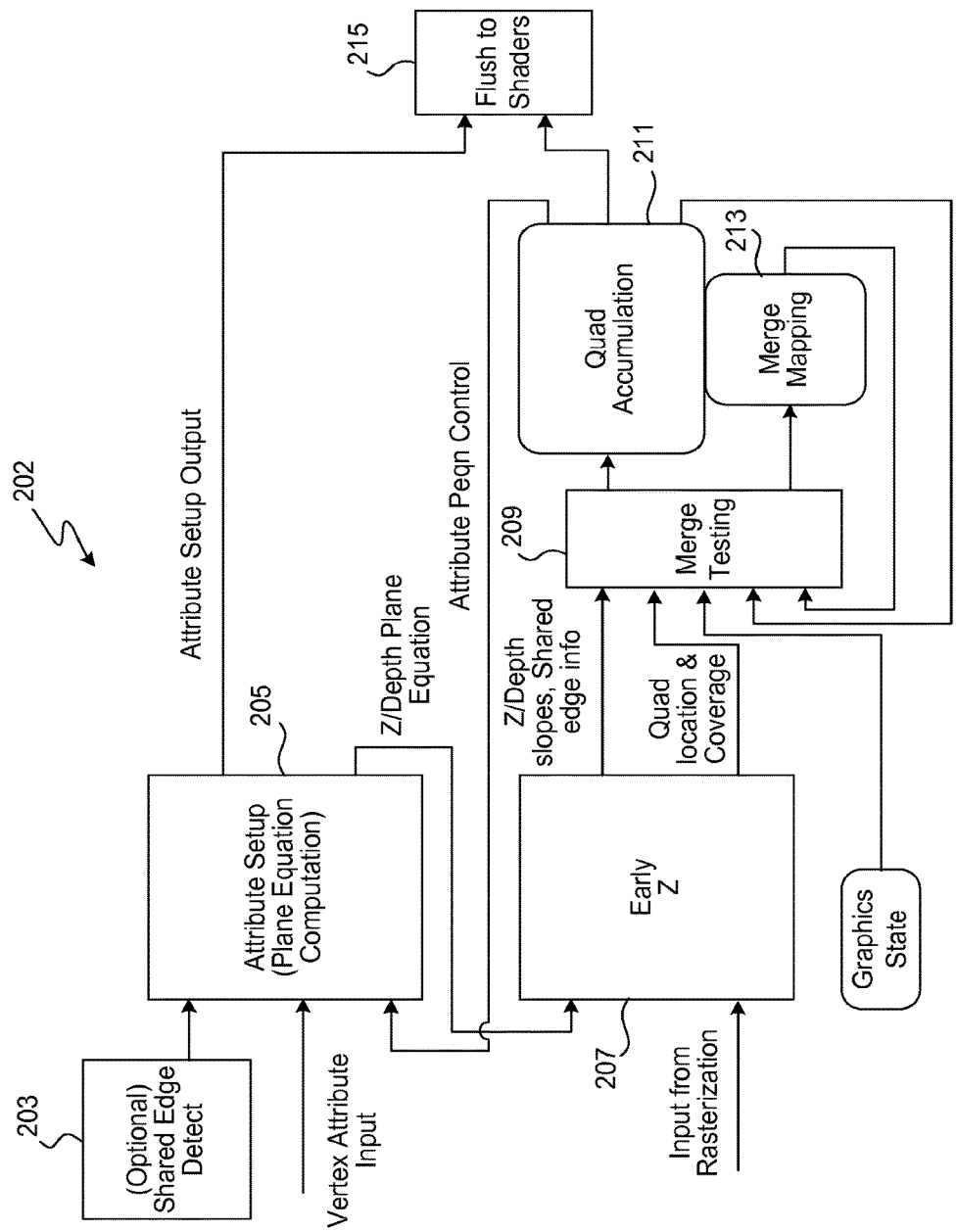
FIG. 2 is a diagram illustrating a quad merging unit in accordance with an embodiment of the present disclosure.

FIG. 2 shows an example of a quad merge unit 202 in accordance with an embodiment of the present disclosure. The quad merge unit 202 includes an input from an optional shared edge detection unit 203, an attribute setup unit 205, an early Z unit 207, a merge testing unit 209, a quad accumulation unit 211, a merge mapping unit 213, and a flush to shaders output 215.

In one embodiment the shared edge detection unit 203 detects when edges between primitives are shared and only enables filtering on edges that are exactly shared. For example, the vertex indices within the vertex data array or arrays may be used to identify shared edges between primitives.

In one embodiment, at the start of a draw call, the quad accumulation unit 211 and merge mapping unit storage 213 are empty. The primitives associated with a draw call are rasterized into quads (or larger blocks such as 4×4 blocks), with live coverage by the rasterizer hardware. The attribute setup unit 205 performs interpolation setup (e.g., plane equation computations) to compute the required depth plane equation for each primitive, which in turn permits the depth of each sample within each primitive to be computed. It will be understood, however, that the attribute setup unit could alternatively implement a barycentric interpolation.

Quads that have coverage within primitives are generated by rasterization and passed through to early Z testing in the early Z unit 207. Z/depth values are computed for each sample that the early Z unit tests. Quads with surviving coverage after early Z testing are sent to the merge testing unit 209, which performs the required merge tests. Those quads that pass the merge tests with remaining coverage are stored in the quad accumulation unit storage 211.

In one embodiment mapping information is stored in the merge mapping element storage 213. This mapping information is also used by the merge testing unit 209.

In one embodiment merge testing is applied to each incoming quad with partial coverage, where a quad is partially covered when the quad is not fully covered, but includes at least 1 live sample. When quads are merged, the results are used to modify the quad accumulation unit storage 211 and the merge mapping unit storage 213.

The results of the quad accumulation are flushed to the shaders. As quad merging is performed on a draw call basis, the flushing may be performed before processing a new draw call, such as at the end of a current draw call or at any time when storage has become too full. In one embodiment, when a draw call is complete or if any structure fills up, primitives (e.g., plane equations and primitive face information) and quads are flushed to the shader. In one embodiment, plane equations are flushed in a synchronous manner with quad data so that an interpolator has access to the plane equations when running a pixel shader for the primitives. Data regulation may be provided so that the buffers in the shader and interpolator are not over-filled.

In one embodiment merging is never performed between different draw calls. The primitives of a particular draw call have a common graphics state, which may include common textures, common shader programs, and attribute variables. In many cases the edges within a draw call are edges that are shared between primitives that are internal to a rendered object within the image (non-silhouette) edges. Quads enclosing internal edges are conventionally rendered twice in pixel shaders. However, on average, 50% of the pixels in these types of quads enclosing internal edges are "helper pixels" that are typically only required so that texture hardware can compute a level of detail. Additionally, overlap between primitives within a draw call is often very rare. Performing quad merging for a draw call permits helper pixels to be removed when pixels from the adjacent primitives are packed together in shared quads. Additionally, texture accesses and variables (such as Vv) are shared between adjacent primitives within a draw call. Merging coverage from one quad into another permits shading one quad instead of two quads. Thus if the coverage of non-overlapping primitives at a quad position can be merged, 50% of these pixel shader threads (on edges) are saved (i.e., 1 of 2 quads). Multiple textures may be used and many other programmed state values may also be included which may control the outcome of rendering.

Figure 3:
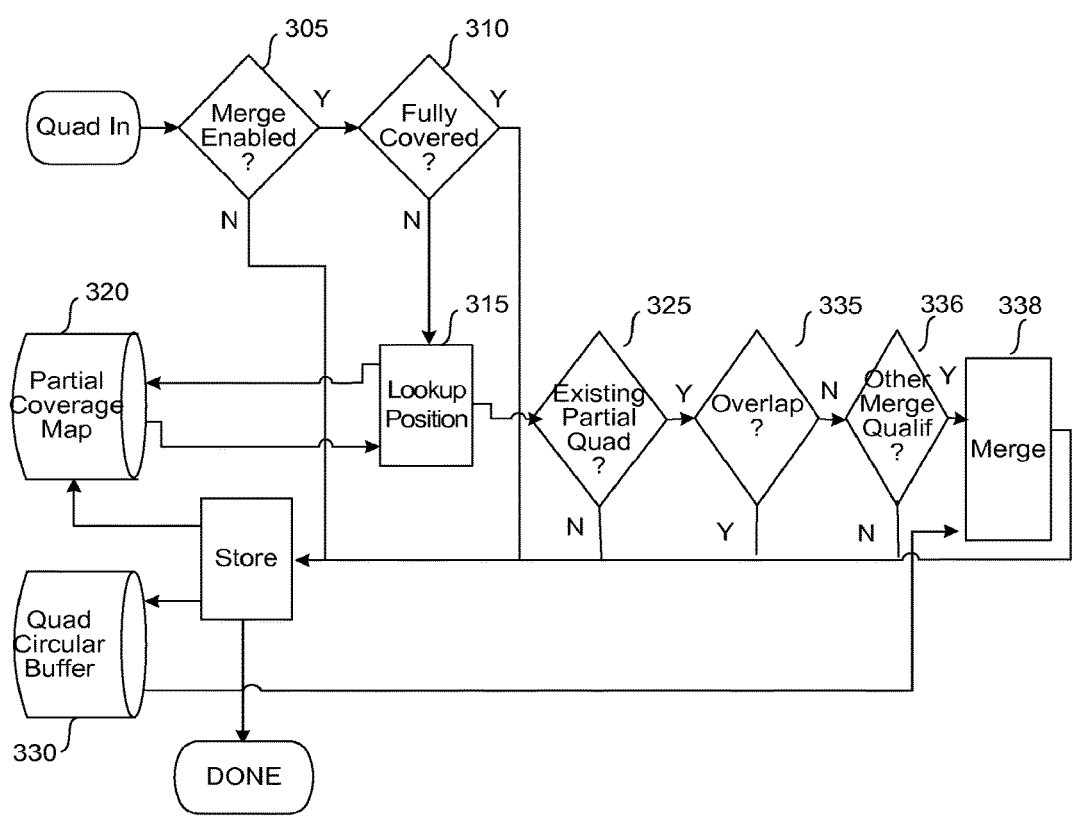
FIG. 3 illustrates a merge testing flow chart in accordance with an embodiment of the present disclosure.

FIG. 3 is a flowchart illustrating additional aspects of merging. In one embodiment input quads (or larger blocks) are filtered as follows.

A merge enabled test is performed in decision block 305. If merging is disabled, then the process writes data into the quad buffer. No modification is performed of the partial coverage map when merging is disabled.

If merging is enabled, then a test is made in decision block 310 whether the quad is fully covered. If the quad is fully covered, that data is written into the quad buffer. No modification is made of the partial coverage map and no merge is performed.

If merging is enabled and the block is not fully covered then the process moves to the lookup the position block 315. The partial coverage map 320 is read to test if an existing quad is partially covered at this quad position in decision block 325. If an existing quad is not partially covered at this quad position, a write is performed into the quad circular buffer 330 and a write performed to the partial coverage map 320. If an existing quad is partially covered at the quad position, then an overlap test is performed in block 335. In one implementation the test for overlap is (input_coverage & stored_coverage)!=0. An additional further merge qualification test 336 may also be included after the overlap test 335. If there is an overlap and any further merge qualification test passes, then merging 338 is not performed and the data is written into the quad circular buffer 330. In one option the partial coverage map 320 is not modified; in another option the partial coverage map points to the new quad. If there is a different face, merging 338 is not performed and data is written into the quad circular buffer 330 without modifying the partial coverage map 320. In one embodiment other merge tests may also be performed (e.g., a depth slope test, an absolute depth test, an interpolation error test, and/or the like).

If the merging 338 is successful, then a step is performed to overwrite a merged (stored or input) quad buffer entry with combined coverage: (input_coverage I stored_coverage). If the combined coverage is full coverage, then the partial coverage map entry is erased. When coverage is merged, either the stored coverage or the input coverage becomes zero because coverage is migrated from one quad to another.

Options may be provided to merge up to a maximum number of primitives (e.g., 2 or more).

When merging 338 is completed, the buffer data is flushed to the pixel shader(s) along with plane equation data. In one embodiment when a draw call is complete or if any structure fills up, primitives (e.g., plane equations and other primitive information) and quads are flushed to the shaders. The plane equations (or equivalent interpolation data) are flushed in a synchronous manner with quad data so an interpolator has access to the plane equations when running the pixel shader(s) for the primitives.

Figure 4:
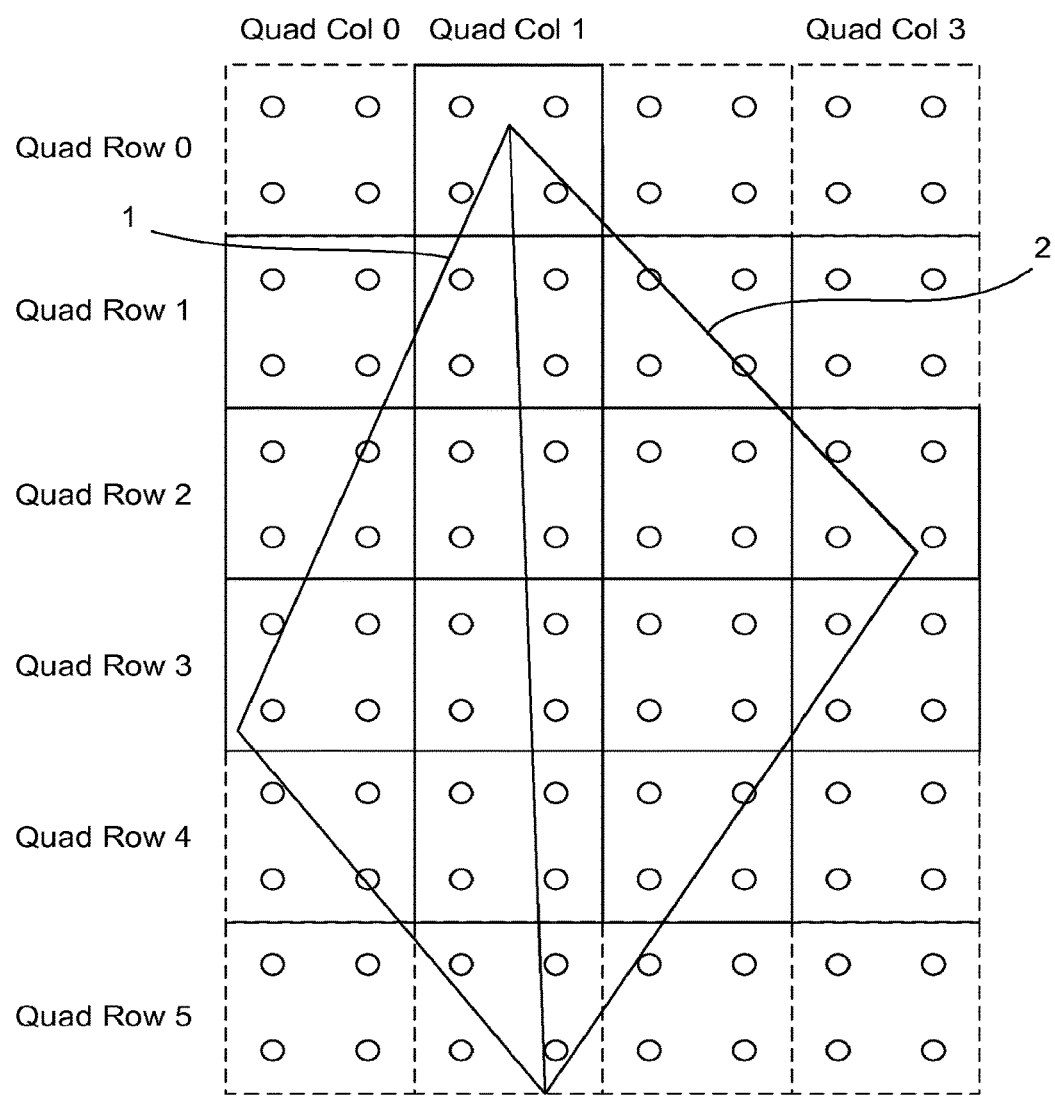
FIG. 4 illustrates aspects of quad merging in accordance with an embodiment of the present disclosure.

FIG. 4 shows a set of quads and two primitives (triangles 1 and 2) having a shared interior edge. Each quad has four pixel centers. As an illustrative example, the quads in triangle 1 may have a blue color and the quads in triangle 2 a yellow color. In quad (1, 1) (row 1, column 1), the left side pixels from triangle 1 can be merged with the pixels from triangle 2 as in quad (2, 1). In quads (3, 1) and (4, 1) the quads are merged into triangle 1.

Figure 5:
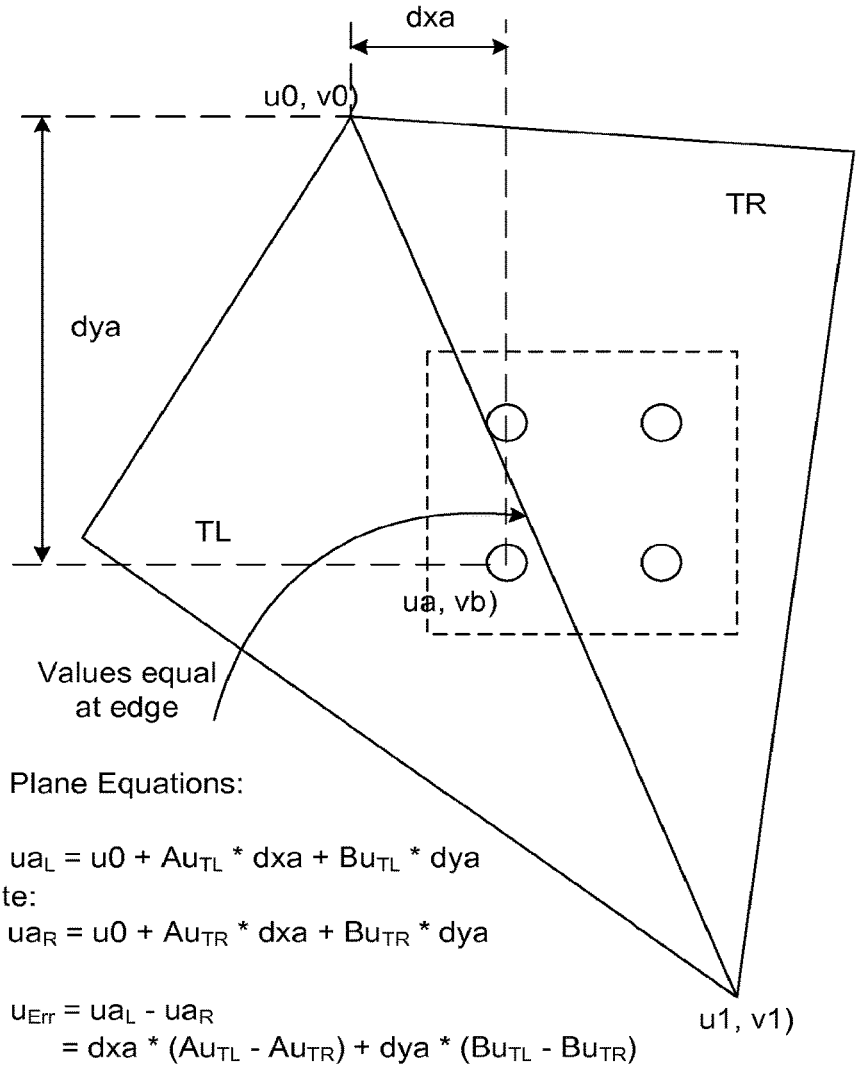
FIG. 5 illustrates aspects of approximation of variable values and interpolation errors in accordance with an embodiment of the present disclosure.

FIG. 5 illustrates approximation of Vv values for textures. The most common usage for Vv values is to access textures. The Vv values could, in theory, be calculated exactly. However, in practice there are benefits to approximating values by interpolation. The Vv values can be approximated. The approximation error is a function of the Vv slope differences between the 2 primitives and the distance from the edge. If only 1 or 2 pixels are moved to the adjacent triangle, the distance from the edge is normally small (<=sqrt(2)). For this situation, texel differences should be indistinguishable. In a typical application it would generally be the case that only 1 or 2 texels along edge will be affected. The affects should thus be small and basically invisible to an ordinary user. However, there may be significant visible errors if one or both slopes are very large. This normally occurs when the depth slope is large. Large depth slope is inexpensive to test for and may be used to disable merging for a particular primitive. However, if the slopes are close enough then 1 or 2 pixels will have small Vv error and, therefore, the same texels are accessed. An optional implementation detail is to compare the slopes of the Vv directly but this requires a more expensive and complex implementation.

Figure 6:
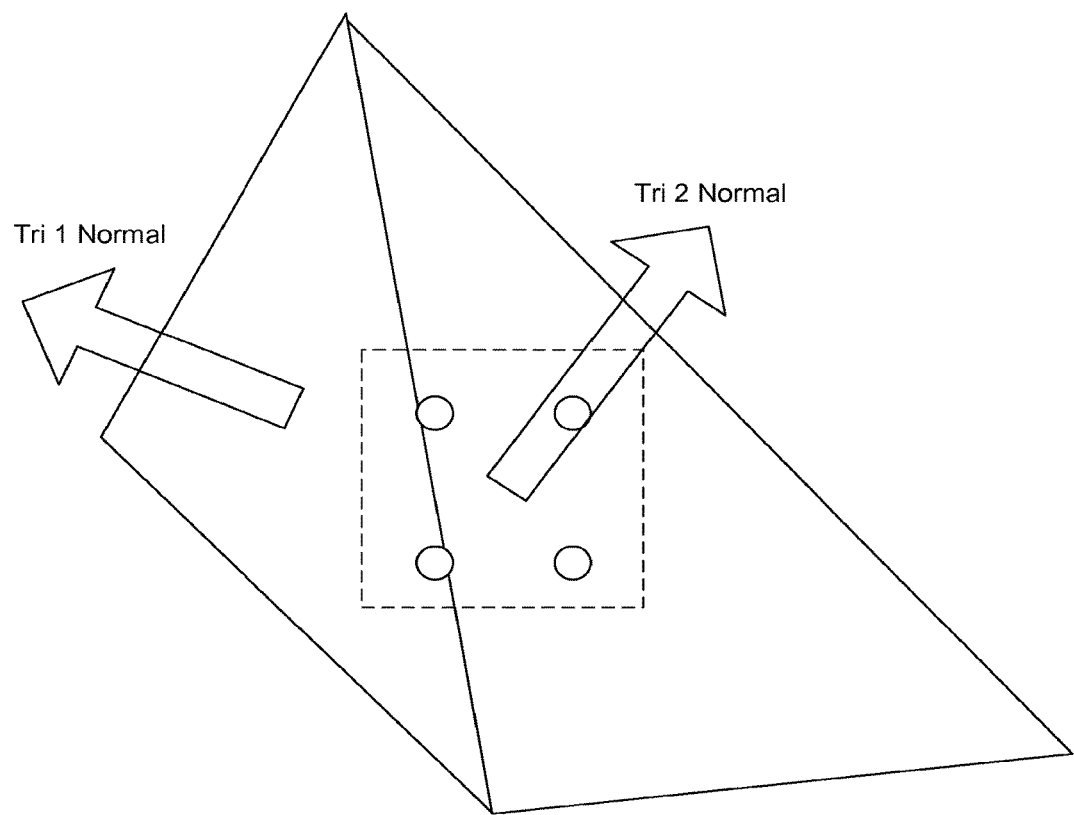
FIG. 6 illustrates aspects associated with specular lighting in accordance with an embodiment of the present disclosure.

FIG. 6 illustrates issues associated with specular lighting. The primitives each have surface normals. If normal values are significantly different from the correct values at particular pixels, specular highlights can be very different at those pixels because of the power function used in specular lighting. This is because specular lighting uses primitive or pixel level normals. The degree to which artifacts occur for specular lighting depends on various factors. If Phong shading is used, which has per primitive normals, this could result in artifacts from merging. If interpolated normals (per pixel normals) are used, visible artifacts are probably minimal. Similarly, if normal maps (per pixel normals) are used, then there will probably be minimal visible artifacts.

While an exemplary quad fragment merging process has been described, the basic approach works for larger blocks in a primitive as well. For example, if rasterization creates aligned 4×4 or 8×8 blocks of pixels and they are fully covered, these can be stored more efficiently as larger blocks and this also improves handling.

An exemplary algorithm for disabling merging when the depth slope is too large, resulting in LOD artifacts, is now described. The LOD is normally not critical because it is computed using a log function. However, the LOD can change quickly and artifacts can occur when the depth (Z) slope of the primitive is very high. Additionally Vv slopes may change rapidly and approximation errors (Vv approximation) will be larger. Exemplary formulas for disabling merging when the depth slope is high may be based on analyzing the derivatives of depth (Z) with respect to x and y, such as by having the sum of derivatives in each x and y being greater than a threshold or each individual derivative in x and y being greater than a threshold:

$(dz/dx+dz/dy)$>threshold or $(dz/dx$>threshold)·parallel·$(dz/dy)$>threshold.

This computation may be performed only once per primitive.

An exemplary interpolation error merge test is now described. In one embodiment the slopes of Vv and/or 1/W are used to estimate which quad will have a lower interpolation error. For example, a threshold in the depth slope may be used to define an interpolation error merge test. If the depth (Z) slopes of 2 primitives differ by a lot then the Vv slopes may differ a lot across the edge between them. In one embodiment merging is disabled when the difference between slopes of z in x, and y for two primitives (having z values z1 and z2) is greater than a threshold:

$(((dz1/dx+dz1/dy)-(dz2/dx+dz2/dy)))$>threshold).

An example embodiment of the present disclosure that disables merging when a difference in depths between two adjacent primitives is too large is now described. Primitives that are almost co-planar can be merged. Depth values for pixels or samples of a primitive are planar in nature in this part of the graphics pipeline. The absolute depth test, according to an embodiment, compares the depth values (e.g., the absolute depth values) of both primitives at a single point in the block (e.g., a pixel within a quad or larger block). The difference (e.g., the absolute difference) between these depth values is computed and then compared with a threshold value. When the difference is smaller in magnitude than the threshold, the 2 blocks (e.g., quads) can be merged.

According to an embodiment, the depth slope test may use a full planar interpolation of depth in a block (e.g., quad) being tested for merging which uses 2 floating point multiplication operations plus floating point addition operations. The absolute depth test may be designed to avoid the use of any floating point multiplication operations to perform the comparisons and may only use floating point addition operations. Multiplication operations may be avoided by using depth computed for the early Z depth/Z compare operation and depth gradients in X and Y. Both the depth slope test and the absolute depth test may use a floating point magnitude compare operation. A very small area and energy may be utilized to perform floating point magnitude compare operations. The multiplier operations may use significantly more area and energy (e.g., double the area and energy) to perform than the addition operations or the magnitude compare operations. As such, the absolute depth test may use less energy and area than the depth slope test. Alternatively, more storage can be traded off for computation improvements. According to some embodiments, a depth test may refer to either an absolute depth test or a depth slope test.

According to an embodiment of the present disclosure, when an absolute depth test, an overlap test, and a face test are used, embodiments of the present disclosure may enable merging when a Boolean value EM is true. For this embodiment, EM can be calculated using the following formula (where an example block size of 4×4 pixels is used to form the block, e.g., 4 quads):

$EM=((abs(StoredZ-Input\_4\times4\_z)<Zthreshold)\&\& \\ (No\_Overlap\&\&Same\_Face)),$ where StoredZ is the stored z value (or depth value) of one of the primitives, Input_4×4_z is the calculated z value of the other one of the primitives, Zthreshold is a maximum threshold difference acceptable for merging a block (e.g., quad), No_Overlap is a Boolean value that is true when there is no overlap between the primitives, Same_Face is a Boolean value that is true when the primitives have a same face, and EM is a Boolean value indicating whether the merge is enabled (true) or not enabled (false).

While embodiments of the present disclosure have been shown to merge blocks (e.g., quads) from two primitives, the present disclosure is not limited thereto and blocks (e.g., quads) from more than two primitives may be combined (e.g., blocks or quads from three or more primitives may be combined).

Aspects of embodiments according to the present disclosure relate to pixel shading in a graphics processing system. More particularly, embodiments of the present disclosure are directed to performing quad fragment merging to reduce a pixel shading overhead.

A relevant device or component (or relevant devices or components) according to embodiments of the present disclosure described herein may be implemented utilizing any suitable hardware (e.g., an application-specific integrated circuit), firmware (e.g., a DSP or FPGA), software, or a suitable combination of software, firmware, and hardware. For example, the various components of the relevant device(s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present disclosure refers to "one or more embodiments of the present disclosure." Also, the term "exemplary" is intended to refer to an example or illustration.

As used herein, "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Features described in relation to one or more embodiments of the present disclosure are available for use in conjunction with features of other embodiments of the present disclosure. For example, features described in a first embodiment may be combined with features described in a second embodiment to form a third embodiment, even though the third embodiment are not be specifically described herein.

Although this disclosure has been described with regard to certain specific embodiments, those skilled in the art will have no difficulty devising variations of the described embodiments, which in no way depart from the scope and spirit of the present disclosure. Furthermore, to those skilled in the various arts, the disclosure itself described herein will suggest solutions to other tasks and adaptations for other applications. It is the Applicant's intention to cover by claims all such uses of the disclosure and those changes and modifications which could be made to the embodiments of the disclosure herein chosen for the purpose of disclosure without departing from the spirit and scope of the disclosure. Thus, the present embodiments of the disclosure should be considered in all respects as illustrative and not restrictive, the scope of the disclosure to be indicated by the appended claims and their equivalents.

What is claimed is:

1. A method of performing coverage merging in a shading stage of a graphics system, the method comprising:
   performing a draw call on primitives and rasterizing the primitives into blocks of pixels;
   selecting the draw call for merge testing of individual blocks;
   performing a depth test on the individual blocks, wherein the depth test does not utilize floating point multiplication operations;
   in response to the depth test being satisfied, merging partially covered fragments of the same draw call of one of the blocks of pixels to form a merged block of pixels; and
   performing shading of the merged block of pixels on a draw call basis.

2. The method of claim 1, wherein merging is disabled for an individual draw call based on one or more of detecting a specular lighting condition and receiving a hint that indicates that merging should be disabled.

3. The method of claim 1, wherein the depth test is one or more of an absolute depth test and a depth slope test.

4. The method of claim 3, wherein the depth test utilizes floating point add and compare operations.

5. The method of claim 1, wherein a graphics state of the draw call comprises a shared texture access and a set of variables.

6. The method of claim 1, further comprising:
   performing a test to exclude overlapping fragments; and
   performing a test to exclude fragments from different faces.

7. The method of claim 1, further comprising:
   performing interpolation of variables describing primitives; and
   performing a threshold test of estimated Z interpolation errors.

8. A method of performing merging in a graphics system, the method comprising:
   accumulating, for a draw call or subset thereof, data of rasterized primitives;
   selecting the draw call for merge testing of individual blocks;
   performing a depth test on the individual blocks, wherein the depth test does not utilize floating point multiplication operations;
   performing, for the rasterized primitives of the draw call, merging for at least one partially covered block satisfying the depth test; and
   performing shading of at least one merged block of the draw call.

9. The method of claim 8, wherein merging is disabled for an individual draw call based on one or more of detecting a specular lighting condition and receiving a hint that indicates that merging should be disabled.

10. The method of claim 8, wherein the depth test is one or more of an absolute depth test and a depth slope test.

11. The method of claim 10, wherein the depth test utilizes floating point add and compare operations.

12. The method of claim 8, further comprising:
    performing a test to exclude overlapping fragments; and
    performing a test to exclude fragments from different faces.

13. The method of claim 8, further comprising:
performing interpolation of variables describing primitives; and
performing a threshold test of estimated Z interpolation errors.

14. A graphics system comprising:
a graphics processing unit (GPU) comprising a merge unit to perform merging on blocks that have coverage within primitives,
wherein the merge unit merges coverage from one block into another, and performs a depth test for blocks on a selectable draw call basis, and
wherein the depth test does not utilize floating point multiplication operations.

15. The graphics system of claim 14,
wherein merging is disabled for an individual draw call based on one or more of detecting a specular lighting condition and receiving a hint that indicates that merging should be disabled, and
wherein when the specular lighting condition is detected, the specular lighting condition comprises a per primitive surface normal.

16. The graphics system of claim 14, wherein the depth test is one or more of an absolute depth test and a depth slope test.

17. The graphics system of claim 16,
wherein the depth test utilizes floating point add and compare operations.

18. The graphics system of claim 14, wherein a graphics state of a draw call comprises a shared texture access and a set of variables.

* * * * *